US006693882B1

(12) United States Patent
Gu et al.

(10) Patent No.: US 6,693,882 B1
(45) Date of Patent: Feb. 17, 2004

(54) FREQUENCY CORRECTION BURST DETECTION

(75) Inventors: Jian Gu, San Diego, CA (US); Prasanna Desai, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,672

(22) Filed: Jan. 26, 1999

(51) Int. Cl.⁷ .................................................. H04J 3/14
(52) U.S. Cl. ........................ 370/252; 370/314; 370/321; 370/347; 370/436; 370/478; 370/509; 375/343; 375/362
(58) Field of Search ................................ 370/321, 337, 370/347, 252, 314, 332, 333, 436, 442, 458, 468, 470, 477, 478, 493, 496, 344, 516, 509–514, 343; 375/362, 364, 366, 368, 340–343

(56) References Cited

U.S. PATENT DOCUMENTS

| | | | | |
|---|---|---|---|---|
| 5,241,688 A | * | 8/1993 | Arora | 455/502 |
| 5,761,250 A | * | 6/1998 | Lin | 375/340 |
| 5,909,471 A | * | 6/1999 | Yun | 375/343 |
| 5,970,102 A | * | 10/1999 | Hwang | 375/344 |
| 6,023,477 A | * | 2/2000 | Dent | 370/509 |
| 6,052,418 A | * | 4/2000 | Watanabe et al. | 375/344 |
| 6,137,843 A | * | 10/2000 | Chennakeshu et al. | 375/340 |

* cited by examiner

Primary Examiner—Dang Ton
Assistant Examiner—Inder Pal Mehra
(74) Attorney, Agent, or Firm—Blakely, Sokoloff, Taylor & Zafman LLP (57) ABSTRACT

A method and an apparatus for detecting a frequency correction burst embedded in a signal which includes ordered samples. The method comprises the following: (a) correlating K sequences of the ordered samples with a predetermined waveform to produce K correlation outputs, each of the K correlation outputs corresponding to one of the K sequences, having a magnitude and being associated with an order index, K being an integer, the predetermined waveform corresponding to the frequency correction burst; (b) storing the K correlation outputs in a buffer according to the order indices; and (c) estimating a parameter based on the K correlation outputs, the parameter indicating detection of the frequency correction burst. The estimated parameter includes a frequency error and an ending time of a frequency correction burst. A quality metric associated with each frequency error is also computed.

49 Claims, 10 Drawing Sheets

FREQUENCY CORRECTION BURST DETECTION

BACKGROUND OF THE INVENTION

1. Field of the Invention

The present invention relates generally to initial acquisition of a signal in a communication system which uses a time division multiple access (TDMA) method for transmission. More particularly, the present invention relates to a method and an apparatus for detecting a frequency correction burst, estimating the frequency error and the burst arrival time for a TDMA communication system, such as the Global System for Mobile communications (GSM).

2. Description of Related Art

The TDMA method allows multiple access by subdividing a duration $T_f$, called the frame duration, into N non-overlapping time slots, each of duration $T_f/N$. Each user who wishes to transmit information is assigned to a particular time slot within each frame. The Global System for Mobile Communications (GSM) is an exemplary communication system which uses the TDMA method for multiple access.

The Global System for Mobile Communications (GSM), originally known as Groupe Spéciale Mobile, was developed as a standard for cellular communication in Europe. GSM offers a wide range of functionality, transmission of voice and data. It has been adopted throughout Europe and the world. The original primary GSM has been expanded to encompass other versions for wider total bandwidths, such as extended GSM, DCS 1800 and PCs 1900.

GSM is a purely digital system. The primary GSM system, also known as GSM 900, uses the 900 MHz band, of which 890–915 MHz is for mobile transmissions, and 935–960 MHz is for base transmissions. There are 124 channels (174 channels for extended GSM, 374 channels for DCS 1800 or PCS 1900) and each channel is 200 kHz wide. The TDMA method is used with 8 time slots, numbered 0 to 7, per channel. GSM uses wide channels to allow high speed digital transmissions, resulting in reducing the effect of fading and minimizing production costs. Gaussian Minimum Shift Keying (GMSK) is used as the modulation process.

The first stage of synchronization between a receiver and a transmitter is called the initial acquisition process. In a mobile communication environment, there are always initial time and frequency errors due to uncompensated local oscillator (LO) error, range uncertainty between the transmitter and the receiver, and motion in a multi-path channel environment. Upon completion of initial acquisition, the time and frequency errors are reduced to within acceptable limits.

Figures 1, 2:
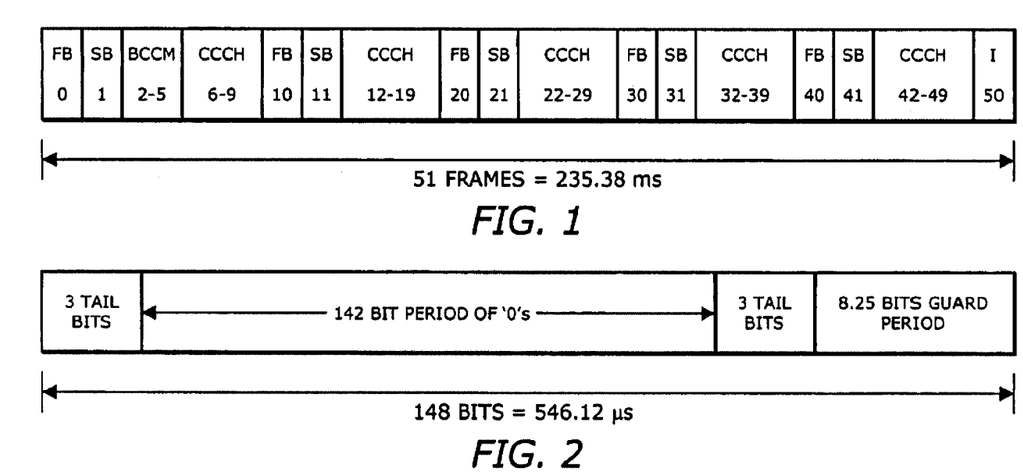
FIG. 1 is a diagram of the known frame structure of the control channel used by the base station.
FIG. 2 is a diagram of the known data structure of a Frequency correction Burst (FB) before differential encoding and modulation.

In GSM, a base station uses a Broadcast Common Control Channel (BCCH) to transmit signaling information. As shown in FIG. 1, the frame structure of the control channel includes 51 TDMA frames lasting 235.38 milliseconds (each TDMA frame is 4.615 ms in duration). Within this repetitive frame structure, each of the information data shown in FIG. 1 is transmitted in time slot 0 of a corresponding TDMA frame. Synchronization data include a Frequency correction Burst (FB) and a Synchronization Burst (SB). Within 235.38 ms, there are 5 FBs, appearing in time slots 0 of frames 0, 10, 20, 30, 40.

The FB is a sine wave at 67.7 kHz above the carrier, lasting 546.12 µs. The FB is formed by differentially encoding a string of 148 bits of values "0" and then modulating the resulting 147 bits. The data structure of the string of 148 bits is as shown in FIG. 2. The string consists of 142 bits (all 0s) preceded by 3 tailing bits (three 0s) and followed by three tailing bits (three 0s) and 8.25 guarding bits (all 1s).

In the acquisition mode, the receiver has to detect the FBs and perform timing and frequency error estimation. The receiver then uses the frequency error estimate to correct the reference frequency of the local oscillator, and the timing estimate in the subsequent demodulation of the Synchronization Burst (SB) which is sent in time slots 0 of frames 1, 11, 21, 31, 41.

In the acquisition mode, a receiver first scans the whole frequency band used for GSM (or extended GSM, or DCS 1800 or PCS 1900) and measures the relative signal strength on up to 124 channels (174 channels for extended GSM, 374 channels for DCS 1800 or PCS 1900), each channel having a bandwidth of 200 kHz, to obtain a list of the strongest channels. Then, the receiver will start to search for the FBs over the channels in the list.

According to the GSM standard, the required frequency accuracy is 0.1 ppm, which is 90 Hz for a 900 MHz carrier. Assuming that the frequency stability of the crystal oscillator of a receiver is 5 parts per million (ppm) (including aging and temperature factors, etc.), the maximum initial frequency offset can be about 5 kHz for GSM 900, and about 10 kHz for DCS 1800 and PCS 1900, when the receiver is first turned on. This initial frequency error must be rapidly detected and reduced to within the GSM requirement.

Accordingly, there is a need for a method and an apparatus to detect the FBs and estimate the initial frequency error in real time with high accuracy in order to meet the GSM standard.

SUMMARY OF THE INVENTION

The present invention is a method and: an apparatus for detecting a frequency correction burst embedded in a signal which includes ordered samples. The method comprises the following: (a) correlating K sequences of the ordered samples with a predetermined waveform to produce K correlation outputs, each of the K correlation outputs corresponding to one of the K sequences, having a magnitude and being associated with an order index, K being an integer, the predetermined waveform corresponding to the frequency correction burst; (b) storing the K correlation outputs in a buffer according to the order indices; and (c) estimating a parameter based on the K correlation outputs, the parameter indicating detection of the frequency correction burst.

The estimated parameter includes a frequency error and an ending time of a frequency correction burst. A quality metric associated with each frequency error is also computed.

DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

The present invention can be practiced in any communication system which uses a frequency correction burst embedded in a transmitted signal to facilitate initial acquisition at a receiver. However, for ease of explanation, the invention is described below as applied to the primary GSM. Thus, this description is not intended to be construed in a limiting sense.

The FB detector of this invention detects a FB, estimates the FB's ending time (or arrival time) with an accuracy of one symbol (3.69 µs), and estimates a frequency error. A quality metric of the estimations is also provided. The quality metric is an important indicator in adverse reception condition such as multipath fading and can be used to determine the number of FBs over which a frequency error estimation or timing estimation should be averaged. The detector operates in real time, i.e., the FB detection and frequency error estimation are performed and updated at the same time for each input sample.

Figure 3:
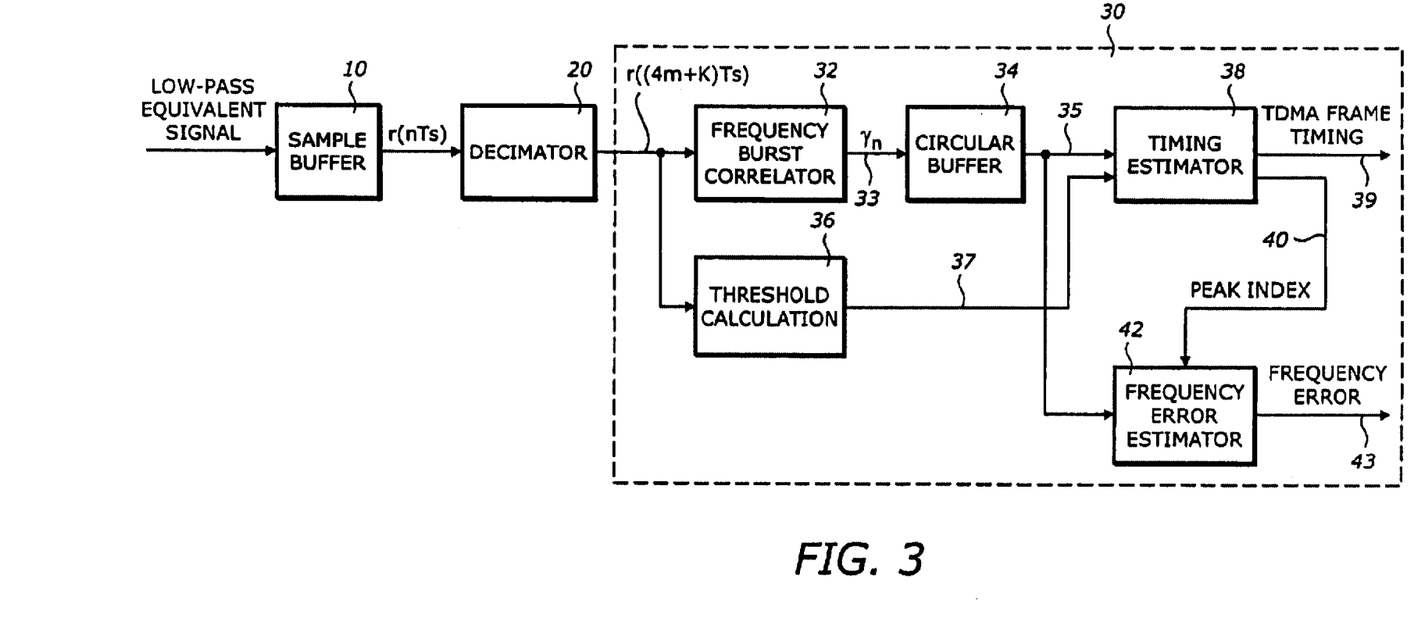
FIG. 3 shows a block diagram of one embodiment of the FB detector of the present invention.

FIG. 3 shows a block diagram of one embodiment of the FB detector of the present invention. The FB detector 30 comprises a FB correlator 32, a circular buffer 34, a threshold module 36, a timing estimator 38, and a frequency error estimator 42. The sampling rate at the input of the FB detector 30 is preferably one sample per symbol, or about 271 kHz.

Referring to FIG. 3, a complex, low-pass equivalent form of a received signal is stored in a sample buffer 10. A decimator 20 is used to reduce the number of samples per symbol, for example, from 4 samples to 1 sample per symbol. The function of the decimator 20 can be equivalently implemented by appropriately addressing the sample buffer 10.

The following discussion describes the underlying principle of the FB detector. In GSM, the GMSK modulator is fed with 147 consecutive 0s and generates a burst of a sinusoidal wave of angular frequency $\omega_c + \omega_1$, where $\omega_c$ is the angular carrier frequency, $\omega_1 = \pi/(2T_b)$ is the angular frequency deviation, and $T_b = 1/270833 \approx 3.69$ µs is the symbol duration.

In the low-pass equivalent complex form, the received FB signal in the sample buffer 10 is $r(nT_s) = e^{j\phi} \cdot e^{j(\omega_1 + \Delta\omega)nT_s}$, where $T_s = T_b/4$ is the sampling period (assuming the sampling rate is 4 samples per symbol), $\phi$ is a constant and $\Delta\omega$ is the frequency error with $|\Delta\omega| < 2\pi \cdot 5000$.

After decimation to one sample per symbol, $r_n = e^{j\phi} \cdot e^{j(\omega_1 + \Delta\omega)(nT_b + kT_s)}$, where epoch k is a value from the set $\{0, 1, 2, 3\}$.

The tap coefficients of the correlator 32 are $C_m = C_0 \cdot e^{j\pi m/2}$ for $m = 1, 2, \ldots, M-1$ with $|C_0| = 1$. M indicates the length of the FB correlator 32. In a preferred embodiment of the FB correlator 32, $C_0 = -j$ (or $e^{-j\pi/2}$) and $M = 16$. This yields $C_{15} = -1$.

The output of the FB correlator 32 is $$y_n = \sum_{m=0}^{M-1} r_{n-m} \cdot C_0 \cdot e^{jm\pi/2} = \sum_{m=0}^{M-1} e^{j\phi} \cdot e^{j(\omega_1 + \Delta\omega)(n-m)T_b + kT_s)} \cdot C_0 \cdot e^{jm\pi/2} \quad (1)$$

$$= e^{j\phi} \cdot e^{j(\omega_1 + \Delta\omega)(nT_b + kT_s)} \sum_{m=0}^{M-1} e^{j(\omega_1 + \Delta\omega)(-mT_b)} \cdot C_0 \cdot e^{jm\pi/2}$$

$$= e^{j\phi} \cdot e^{j(\omega_1 + \Delta\omega)(nT_b + kT_s)} \cdot C_0 \sum_{m=0}^{M-1} e^{j(\Delta\omega)(-mT_b)}$$

$$= e^{j\phi} \cdot e^{j(\omega_1 + \Delta\omega)(nT_b + kT_s)} \cdot C_0 \cdot (1 - e^{-jM\Delta\omega T_b}) / (1 - e^{-j\Delta\omega T_b})$$

$$= e^{j\phi} \cdot e^{j(\omega_1 + \Delta\omega)(nT_b + kT_s)} \cdot C_0 \cdot e^{-j(M-1)\Delta\omega T_b/2} \cdot \frac{\sin(M\Delta\omega T_b/2)}{\sin(\Delta\omega T_b/2)}$$

Therefore, $|Y_n|$ $$|y_n| = \left| \frac{\sin(M\Delta\omega T_b/2)}{\sin(\Delta\omega T_b/2)} \right|,$$

which is independent of k and n. This shows that the magnitude of the output of the correlator is independent of the sampling epoch, even when the sampling rate at the input of the FB detector 30 is one sample per symbol ($T_b$).

Figure 4:
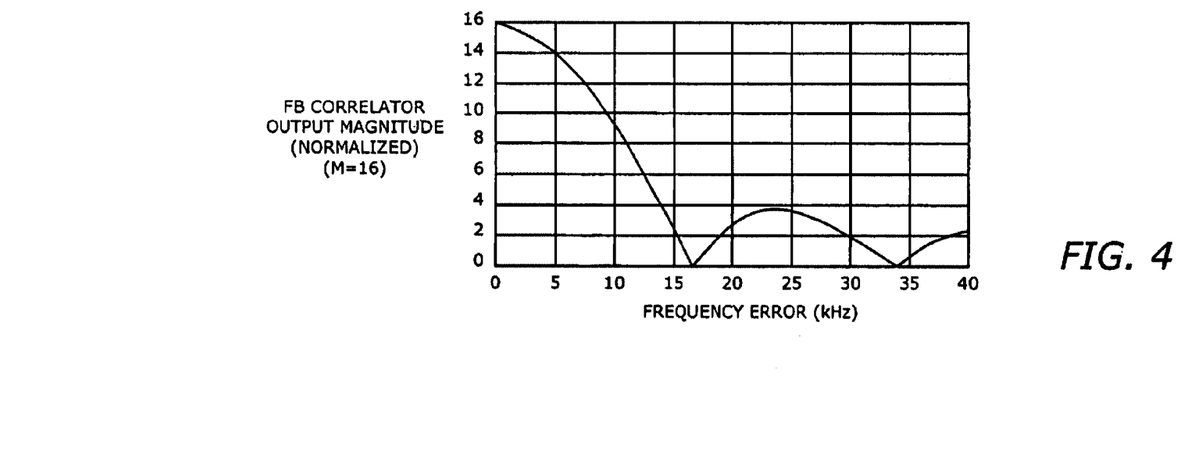
FIG. 4 is a graph of the output magnitude of the FB correlator versus the frequency error for the case of M=16.

For M=16, $|y_n|=16$ for $\Delta\omega=0$, and $|y_n|=13.81$ for $\Delta\omega=2\pi \cdot 5000$. FIG. 4 shows the magnitude of the output of the FB correlator 32 as a function of the frequency error. For M larger than 16, the magnitude of the FB correlator output may yield a higher peak when no frequency error is present, but, as the frequency error increases, the magnitude of the FB correlator output decreases and reaches zero much faster than it does in the situation where M is smaller than 16. In this exemplary embodiment, M is chosen to be 16.

In order to obtain the frequency error information, the real part of the complex number $$y_n \cdot y^*_{n-1} = |C|^2 \cdot e^{j\Delta\omega T_b}, \text{ where } C = \frac{\sin(M\Delta\omega T_b/2)}{\sin(\Delta\omega T_b/2)}, \quad (2)$$

is considered. The real part is equal to $$Re(y_n \cdot y^*_{n-1}) = |C|^2 \cdot \cos(\Delta\omega T_b + \pi/2) = -|C|^2 \cdot \sin(\Delta\omega T_b) \approx -|C|^2 \Delta\omega T_b \quad (3)$$

if $\Delta\omega T_b$ is small, and where Re(.) denotes the real part of the argument. $|C|$ is in fact the magnitude of the output of the FB correlator and can be compensated by an appropriate scaling.

Similarly, the imaginary part of $Y_n \cdot Y^*_{n-4} = |C|^2 \cdot e^{j4\pi/2} \cdot e^{j\Delta\omega \cdot 4T_b}$ is
$Im(y_n \cdot Y^*_{n-4}) = |C|^2 \cdot \sin(\Delta\omega \cdot 4T_b) \approx |C|^2 \cdot \Delta\omega \cdot 4T_b$ if $\Delta\omega \cdot 4T_b$ is small (4)

where Im(.) denotes the imaginary part of the argument. The imaginary part in equation (4) contains the phase difference information between the two samples $y_n$ and $y_{n-4}$, namely, $\Delta\omega 4T_b$.

The following numerical examples illustrate the accuracy of the above approximations in equations (3) and (4). If $\Delta\omega=2\pi\cdot 5000$, then $\sin(\Delta\omega\cdot T_b)=0.115737$ and $\Delta\omega\cdot T_b=0.115997$. Thus, the relative error of the approximation in equation (3) with respect to unity is less than $2.6\times10^{-4}$. If $\Delta\omega=2\pi\cdot 5000$, then $\sin(\Delta\omega\cdot 4T_b)=0.44752$ and $\Delta\omega\cdot 4T_b=0.464$. Thus, the relative error of the approximation in Equation (4) with respect to unity for this case is less than $1.65\times10^{-2}$. If $\Delta\omega=2\pi\cdot 500$, then $\sin(\Delta\omega\cdot 4T_b)=0.046382317$ and $\Delta\omega\cdot 4T_b=0.046398963$, and the relative error of the approximation in Equation (4) with respect to unity is less than $1.665\times10^{-5}$. This shows that when the frequency error is small (e.g., 500 Hz), the above approximations are very accurate. Such an estimation accuracy for a larger frequency error is not needed, since the frequency of the voltage controlled oscillator (VCO) in the receiver, controlled by the frequency error output of the FB detector, will be reduced to within $|\Delta\omega|2\pi\cdot 500$ after the first FB is detected. Once the frequency error is within this range, the major task of the receiver is to make residual estimation error smaller in order to maintain a tracking accuracy of 0.1 ppm (i.e., 90 Hz for GSM) in a noisy environment (which includes quantization noise and interference).

The output of the FB correlator 32 can be expressed as a recursive equation as follows:

$$y_n = \sum_{m=0}^{M-1} r_{n-m} \cdot C_0 \cdot e^{jm\pi/2} \quad (5$$

$$= r_n \cdot C_0 + \sum_{m=1}^{M-1} r_{n-m} \cdot C_0 \cdot e^{jm\pi/2} + r_{n-M} \cdot C_0 \cdot e^{jM\pi/2} - r_{n-M} \cdot C_0 \cdot e^{jM\pi/2}$$

$$= r_n \cdot C_0 + \sum_{m=1}^{M} r_{n-m} \cdot C_0 \cdot e^{jm\pi/2} - r_{n-M} \cdot C_0 \cdot e^{jM\pi/2}$$

$$= r_n \cdot C_0 + e^{j\pi/2} \cdot \sum_{m=0}^{M-1} r_{n-1-m} \cdot C_0 \cdot e^{jm\pi/2} - r_{n-M} \cdot C_0 \cdot e^{jM\pi/2}$$

$$= r_n \cdot C_0 + j \cdot y_{n-1} - r_{n-M} \cdot C_0 e^{jM\pi/2}$$

$$= -j \cdot r_n + j \cdot y_{n-1} + j \cdot r_{n-16} \; (M=16)$$

Figure 5:
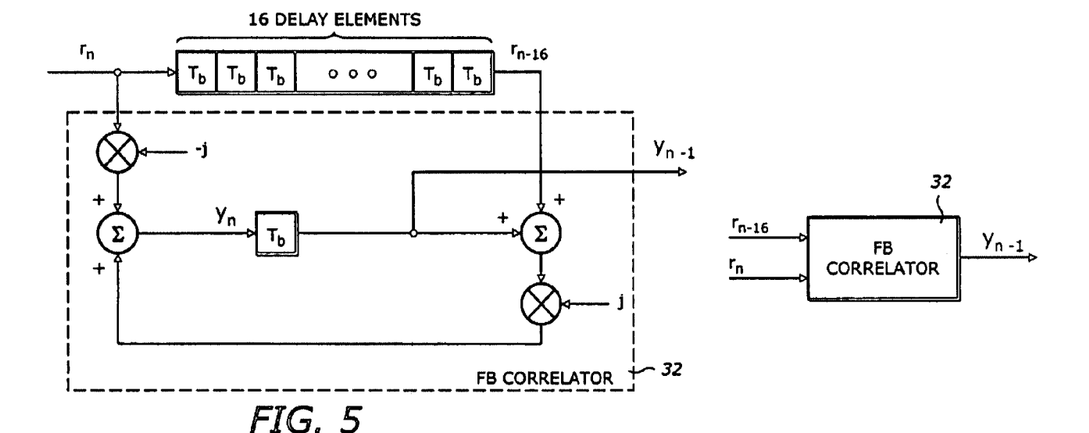
FIG. 5 shows a diagram of the structure of the FB correlator.

The structure shown in FIG. 5 is used to implement the above recursive equation. The FB correlator 32, as implemented in FIG. 5, has two inputs, one output, and requires no scalar multiplication since multiplications by the imaginary numbers j and –j only require rotations. Thus, the FB correlator 32 can be implemented such that the number of arithmetic operations is reduced.

It is noted that the structure of the FB correlator 32 as shown in FIG. 5 can be used for any M which is equal to $2^L$ where L is an integer greater than 1. For other values of M, the multipliers used in the FB correlator 32 will be different than j and –j.

Figure 6:
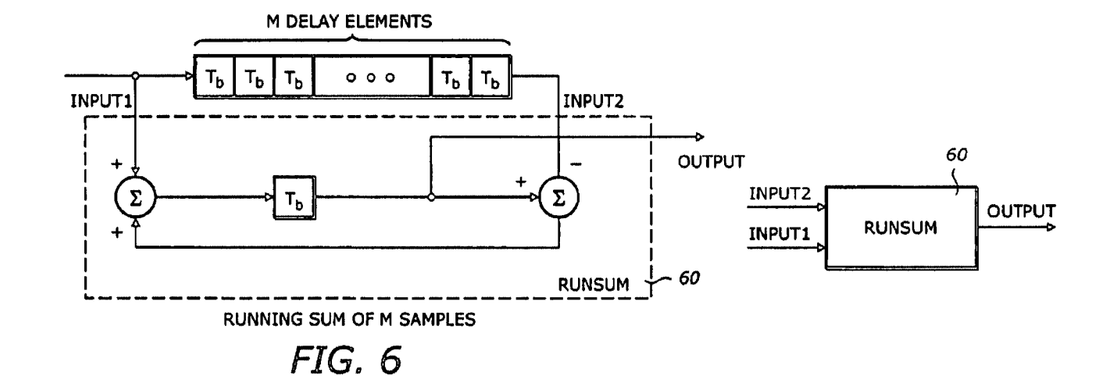
FIG. 6 is a diagram of the general structure of a running sum module that calculates the sum of the M most recent samples.

Similarly, a summation of M samples can be implemented with a structure having a small number of arithmetic operations. FIG. 6 shows such a structure. A running sum module 60 has two inputs and one output. The running sum module 60 performs a running sum of M consecutive samples, where the number M indicates the number of samples that separate the two inputs.

Figure 7:
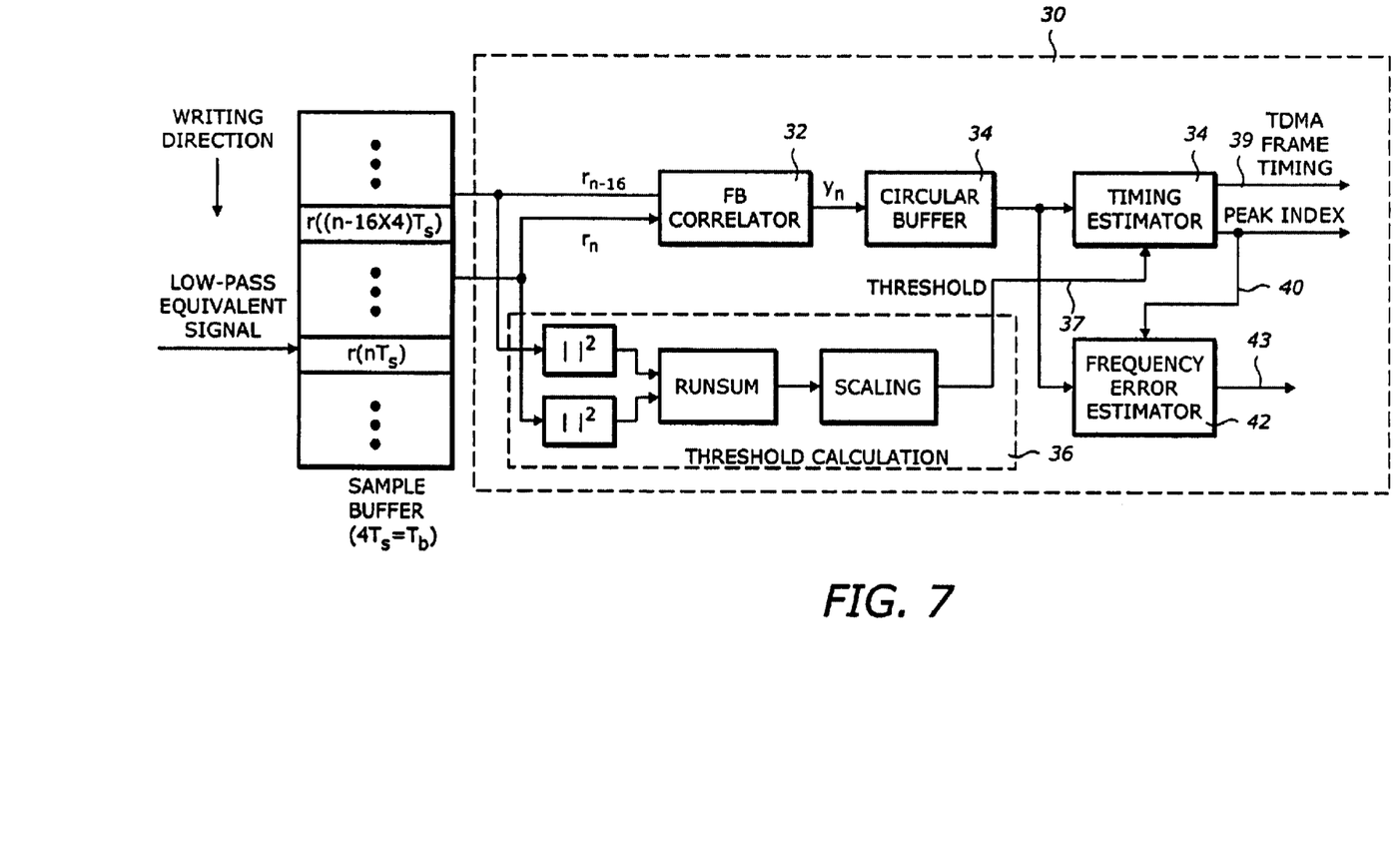
FIG. 7 is a diagram of another embodiment of the FB detector which uses the modules shown in FIGS. 5 and 6.

When the memories needed for the delay elements in FIGS. 5 and 6 are implemented in conjunction with the sample buffer 10, they can be part of the sample buffer 10, and the function of the decimator 20 can be realized by appropriately addressing the sample buffer. FIG. 7 shows the structure of such an implementation. When the receiver is in the acquisition mode, the samples in the sample buffer 10 are preferably stored in a circular way, i.e., the sample with the ending address is stored right before the sample with the starting address of the sample buffer 10. The sample buffer 10 may also be used for other modes after the acquisition process.

The output $y_n$ of the FB correlator 32 are stored in a circular buffer 34 at a rate of one sample per symbol. The magnitude of $y_n$ reaches its maximum during a frequency correction burst. A threshold is provided in order to determine whether a frequency correction burst is received. In consideration of the variations of the signal level, the threshold is calculated relative to the average power level of the contributing input samples of the FB correlator 32. The threshold calculation module 36 computes the average power of a number input samples and scales it to an appropriate value. In the exemplary implementation shown in FIG. 7, the number of input samples used for this computation is 16.

The timing estimator 38 determines whether a frequency correction burst has occurred and outputs the ending time of the detected frequency correction burst. Equivalently, the arrival time of the detected frequency correction burst can also be outputted instead. In a GSM system, the TDMA frame timing 39 which is the start time of a TDMA frame can be easily computed from the starting or ending times of the frequency correction bursts, since the frequency correction bursts occur within a known repeating pattern within the signaling multi-frame structure of GSM as shown in FIG. 1.

Figure 8:
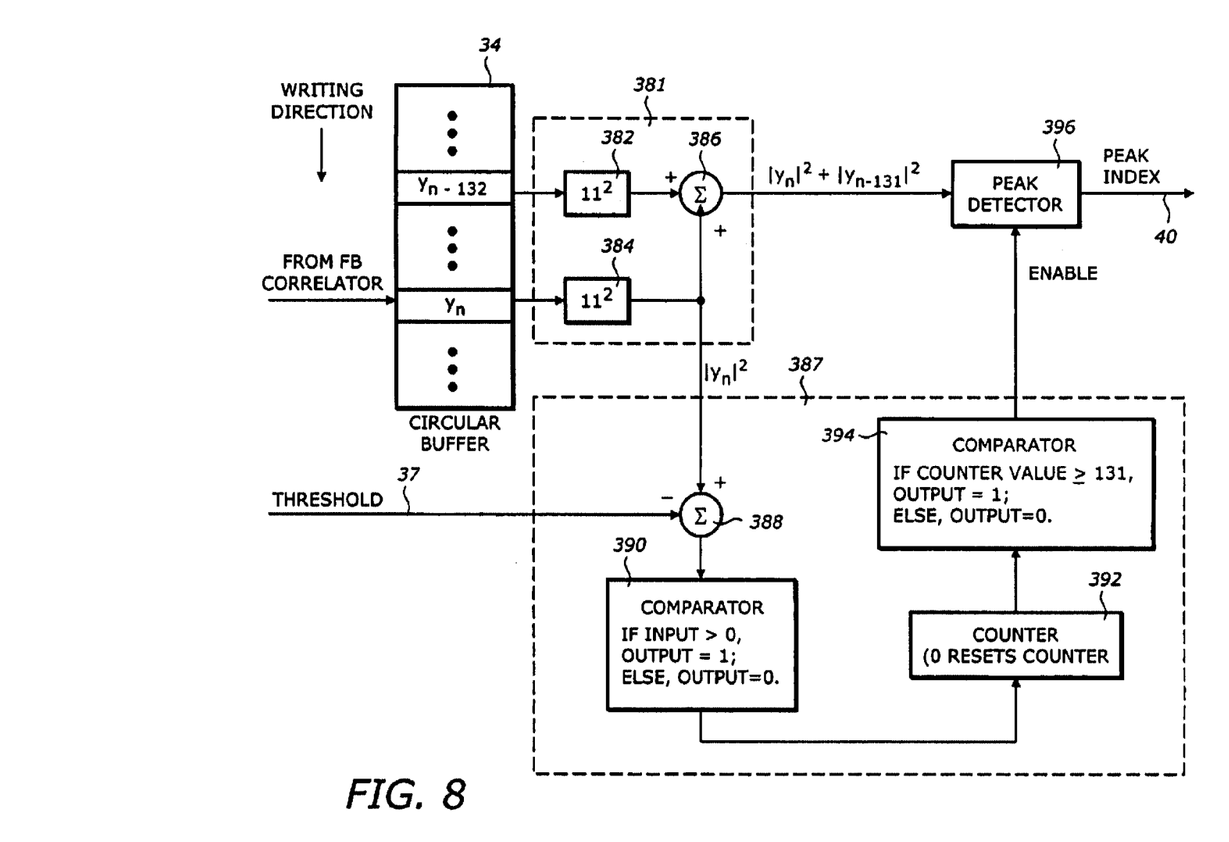
FIG. 8 is a diagram of the timing estimator.

FIG. 8 is a block diagram of the timing estimator 38. The timing estimator 38 comprises a combining module 381, a peak detector 396 and a counter module 387.

The combining module 381 comprises two squared magnitude computing modules 382, 384 and an adder 386. The counter module comprises an adder 388, two comparators 390, 394 and a counter 392.

The two squared magnitude computing modules 382, 384 compute the squared magnitudes of $y_{n-131}$ and $y_{n3}$, respectively. The adder 388 subtracts the threshold 37 from the value $|y_n|^2$. If the output of the adder 388 is strictly positive, i.e.; if $|y_n|^2$ is greater than the threshold 37, then the comparator 390 outputs a 1, otherwise it outputs a 0. The counter 392 counts consecutive 1s that are outputted from the comparator 390. Any 0 outputted from the comparator 390 will reset the counter 392. This resetting occurs often for FSM when the received signal is a randomly modulated GMSK signal, instead of a FB. If the count value reaches 131, then the comparator 394 outputs a control signal value of 1 which enables the peak detector 396.

The peak detector 396 is enabled by the control signal to receive a number of values of $|y_n|^2+|y_{n-131}|^2$, for example 32 values. The number 131, which is equal to the length of a frequency correction burst minus the length of the FB correlator, is chosen in order to obtain an accurate timing estimation and reduce the false detection probability of a frequency correction burst. The enabled peak detector 396 examines a set of values of $|Y_n|^2+|y_{n-131}|^2$ and determines the sample index nmax which corresponds to the maximal value in the set. This peak index nmax 40 is the estimate of the ending time of the frequency correction burst. The TDMA frame timing 39 which is the start time of a TDMA frame is computed from the peak index 40.

Figure 9:
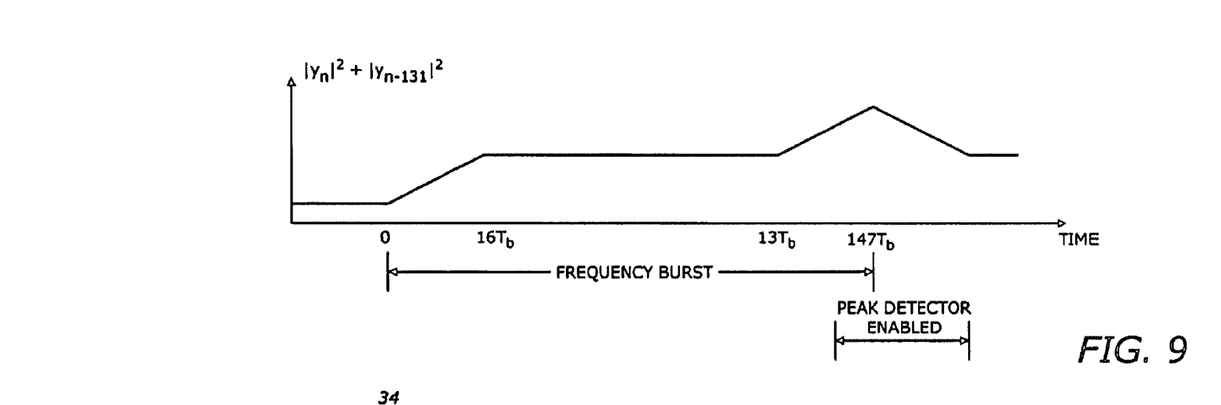
FIG. 9 is a graph of the sum of the squared magnitudes of two correlation outputs as a function of time, illustrating the principle of timing estimation.

FIG. 9 illustrates the principle of the timing estimation. The FB correlator output $y_{nmax}$ represents the correlation of 16 samples over the end portion of the frequency correction burst, while $Y_{nmax-131}$ represents the correlation of 16 samples over the beginning portion of the burst. Since the two correlations are spaced 131 symbols apart in time, and since a frequency correction burst in the GSM is a pure sine wave of 147 symbols, the peak detector 396 will not achieve its maximum in $|Y_n|^2+|y_{n-131}|^2$ with any index value n that is smaller or larger than nmax.

Figure 10:
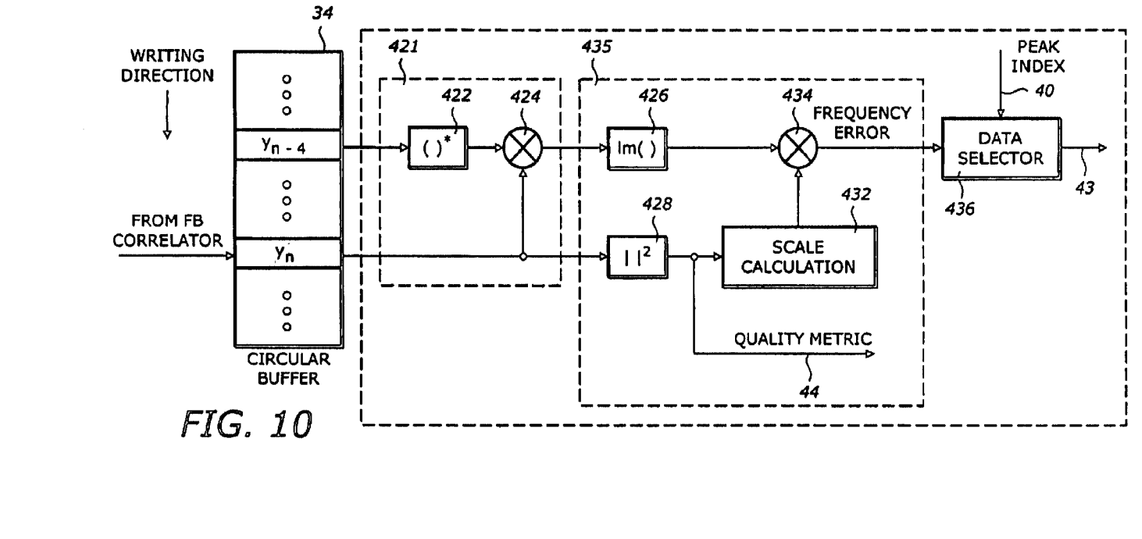
FIG. 10 is a diagram of one embodiment of the frequency error estimator.

FIG. 10 is a block diagram of the frequency error estimator 42 which comprises a second combining module 421 and a frequency module 435.

The second combining module 421 includes a complex conjugate module 422 and a multiplier module 424. The frequency module 435 includes an imaginary part module 426, a squared magnitude module 428, a scale calculation module 432, and a multiplier module 434.

The complex conjugate module 422 computes the complex conjugate of a correlation output $y_{n-4}$ stored in the circular buffer 34. The multiplier module 424 multiplies the output of the complex conjugate module 422 with the current correlation output $y_n$ and outputs the result to the imaginary part module 426 which extracts the imaginary part of the complex number $y_n y^*_{n-4}$. The squared magnitude module 428 computes the squared magnitude of the current correlation output $Y_n$ and outputs this value as a quality metric 44. The scale calculation module 432 receives $|y|^2$ and computes a scale value corresponding to this value of $|y_n|^2$. The multiplier module 434 multiplies $Im(y_n \cdot y^*_{n-4})$ by the scale value to compensate for the factor $|y_n|^2$ in $Im(y_n \cdot y^*_{n-4})$, and outputs the result as a frequency error. Due to the scale value, the frequency error 41 has an appropriate unit such as Hz.

The frequency error estimator 42 also includes an optional data selector 436 which continuously receives the frequency errors outputted from the multiplier module 434, and, upon reception of the peak index 40, outputs a frequency error 43 which corresponds to the peak index 40. A multiplexer (MUX) can be used to implement the data selector 436.

Figure 11:
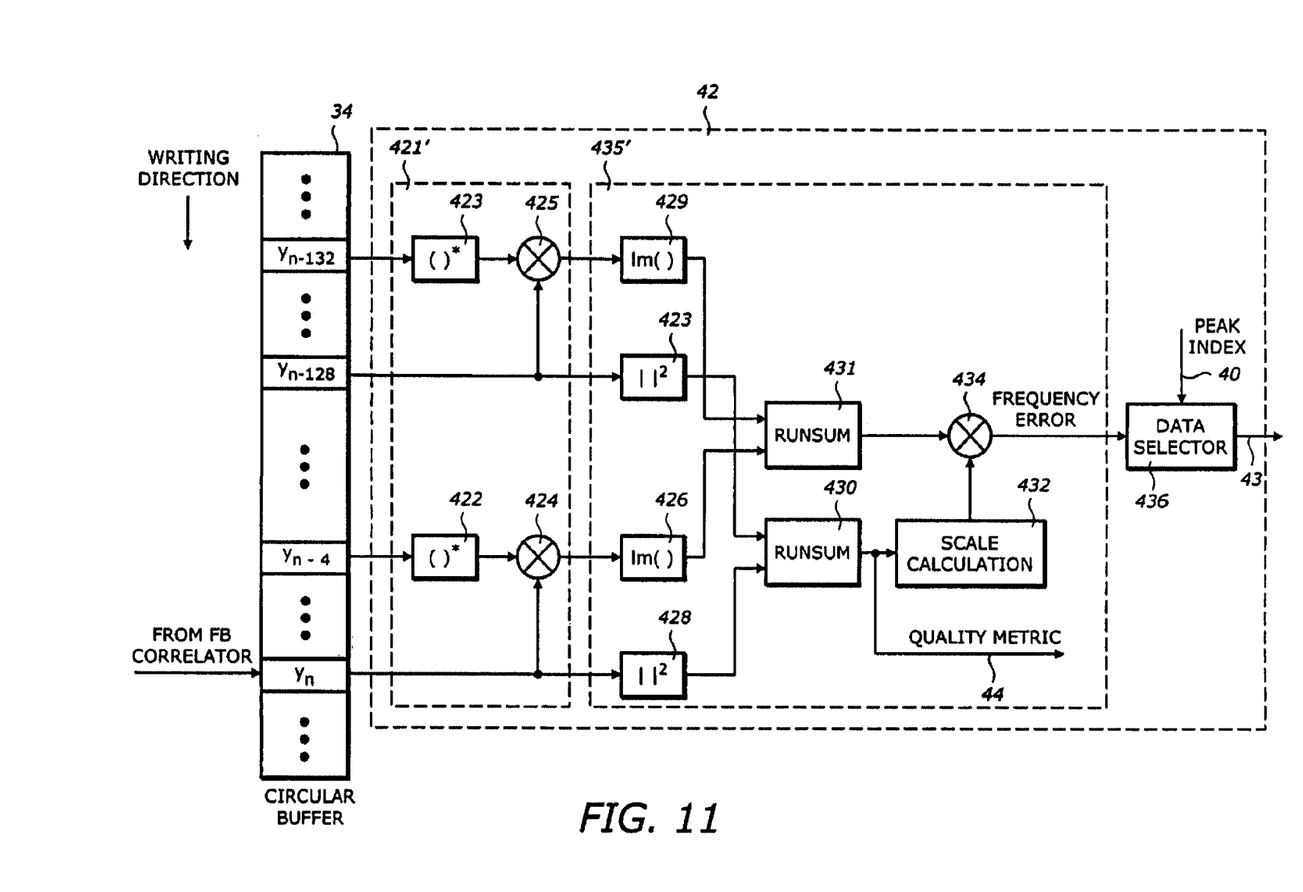
FIG. 11 is a diagram of another embodiment of the frequency error estimator, the output of which is an average of the previous 116 estimates.

In a second embodiment of the frequency estimator 42, to reduce the effects of noise and interference on the estimation accuracy, the frequency error 41 and quality metric 44 are averages of a number of estimates. FIG. 11 shows an implementation of this embodiment.

Referring to FIG. 11, the frequency error estimator 42 comprises a second combining module 421', a frequency module 435' and an optional data selector 436.

The second combining module 421' includes two complex conjugate modules 422 and 423 and two multiplier modules 424 and 425. The frequency module 435' includes two imaginary part modules 426 and 427, two squared magnitude modules 428 and 429, two running sum modules 430 and 431, a scale calculation module 432, and a multiplier module 434.

The complex conjugate modules 422, 423 compute the complex conjugates of correlation outputs $y_{n-4}$ and $y_{n-132}$, respectively, which are stored in the circular buffer 34. The multiplier modules 424, 425 multiply the outputs of the complex conjugate modules 422, 423 with the correlation outputs $y_n$ and $y_{n-128}$, respectively, and output the results to the imaginary part modules 426, 427 which extract the imaginary parts of the complex numbers $Y_n y^*_{n-4}$ and $y_{n-128} y^*_{n-132}$, respectively.

The squared magnitude modules 428, 429 computes the squared magnitudes of the correlation outputs $y_n$ and $y_{n-128}$. These two values are inputted to the running sum module 430 which outputs a quality metric 44. Each of the running sum modules 430, 431 is as shown in FIG. 6 where the order indices of input1 and input2 differ by 128. The scale calculation module 432 receives the output of the running sum module 430, which is a sum of 128 estimates of $|y_n|^2$, and computes a scale value corresponding to this value.

The running sum module 431 receives as inputs the outputs of the imaginary part modules 426, 427, and outputs a sum of 128 estimates of $Im(y_n \cdot y^*_{n-4})$ The multiplier module 434 multiplies the output of the running sum module 431 by the output of the scale calculation module 432 to compensate for the magnitude factor in the sum of 128 estimates of $Im(y_n \cdot y_{n-4})$, and outputs the resulting value as a frequency error 41. Due to the appropriate scale value, the frequency error 41 has an appropriate unit such as Hz.

The optional data selector 436 continuously receives frequency errors from the multiplier module 434, and, upon reception of the peak index 40, outputs a frequency error 43 which corresponds, to the peak index 40.

In the frequency error estimator 42 of FIG. 11, running sums of 128 estimates for both the frequency error and the quality metric, namely, $$\sum_{k=0}^{127} Im(y_{n-k} \cdot y^*_{n-k-4}) \quad \text{and} \quad \sum_{k=0}^{127} |y_{n-k}|^2,$$

are calculated. Since the order indices of each pair of correlation outputs used in the calculation of an estimate for a frequency error differ by 4, the total number of estimates used in a running sum is chosen to be 128=137−4+1 in order to include in the summation all the estimates that are within a frequency correction burst when the latest estimate in the summation is at the end of the frequency correction burst. The frequency error estimator 42 operates continuously for each new correlation output $y_n$ coming in the circular buffer 34. When the timing estimator 38 ouputs the ending time of a detected frequency correction burst, a frequency error 43 and a corresponding quality metric 44 are outputted almost instantly.

Figure 12:
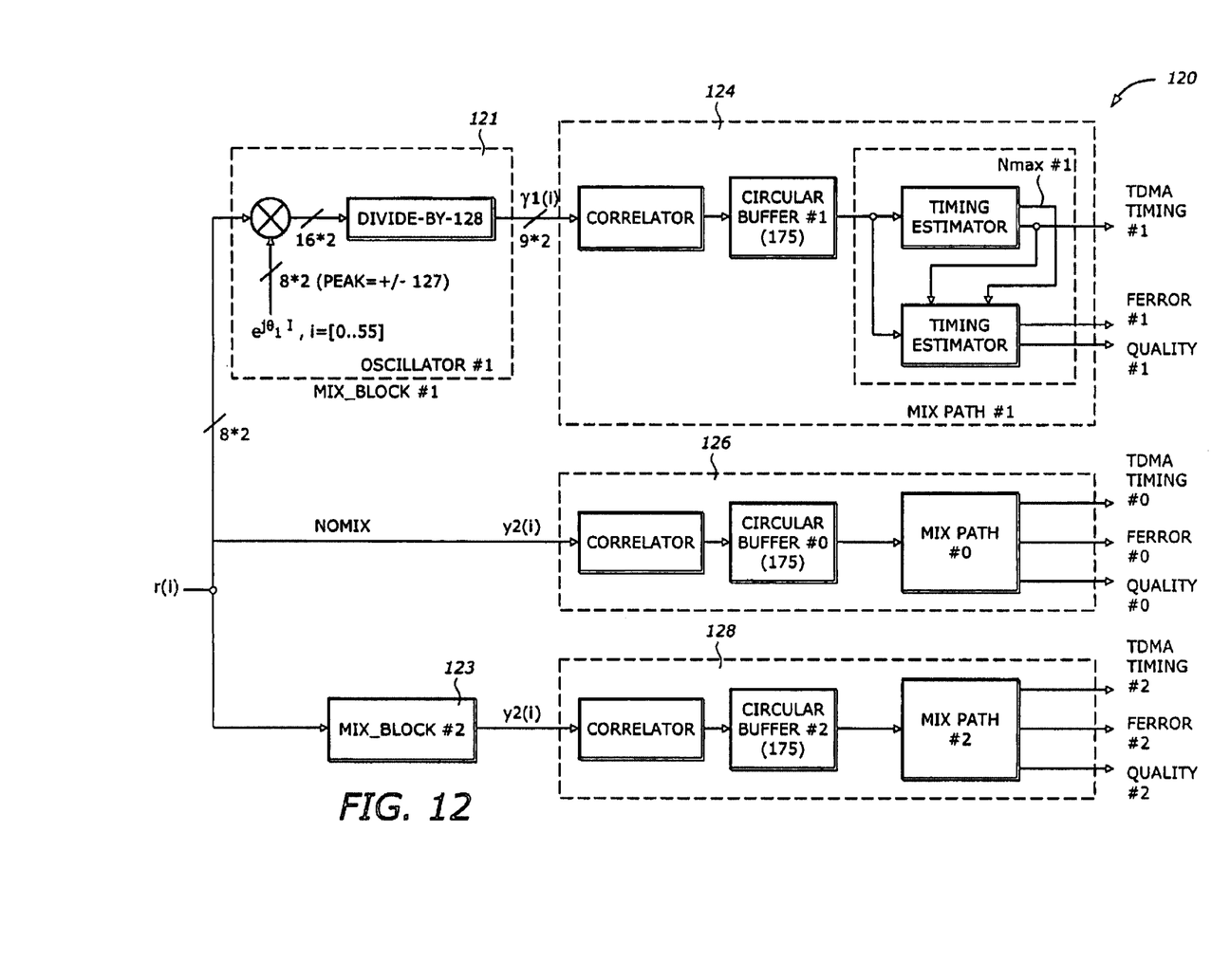
FIG. 12 is a diagram of a first system for detecting a frequency correction burst with low probability of missed detection.

FIG. 12 is a diagram of a system 120 which includes three frequency error estimators 124, 126, 128. The system 120 can detect a frequency correction burst in a received signal with low probability of missed detection. The system 120 also includes two mixers 121, 123. Each of the mixers translates the carrier frequency of the received signal by a predetermined amount of frequency.

Referring to FIG. 12, the system 120 processes the received signal r(i) through three processing paths to produce three sets of outputs. Each set of outputs includes a TDMA frame timing estimate, a frequency error estimate, and an associated quality metric. Each of the TDMA frame timing estimates can be derived from a corresponding peak index.

The advantage of the system 120 over the single path system of FIG. 3 (or FIG. 7) is that the system 120 provides a lower probability of missed detection when the frequency error to be estimated is large. A large initial frequency error may be due to the use of an inexpensive crystal oscillator having low accuracy. The preferred embodiment of the system of FIG. 3 can perform satisfactorily when the frequency error is within the range±5 kHz. If the frequency error due to an inaccurate crystal oscillator is outside this range, then the system of FIG. 3 may miss the detection of a FB. In contrast, the system 120 of FIG. 12 has a lower probability of missed detection due to the two additional paths. The mixers 121, 123 in these two paths translate the center frequency of the received signal by frequency amounts $f_1$, $f_2$, respectively. This allows the FB detectors 124, 128 of these two paths to search for a FB at two different frequencies than the one at which the FB detector 126 is searching. Thus, the system 120 can estimate a larger frequency error than the system of FIG. 3. If the frequency amount $f_1$ is the negative of $f_2$, then the frequency search range is symmetrical with respect to the frequency at which the FB detector 126 is operating. If $f_1=-f_2$, then the implementation of the mixers 121 and 123 is also simplified.

In addition to being capable of detecting a FB despite a large initial frequency error due to the crystal oscillator of the receiver, the system 120 also has better resilience to carrier phase changes. It can be shown analytically, and verified by simulation, that the system 120 can detect a FB correctly even when the digital amplitude gain control (AGC) amplifiers in the receiver cause a 180 degrees phase change in the received signal.

It is clear to one skilled in the art that, for very large frequency errors, for example, for an error larger than±10 kHz, more than three paths may be needed. The system 120 of FIG. 12 can be easily expanded to operate in such a case.

Figure 13:
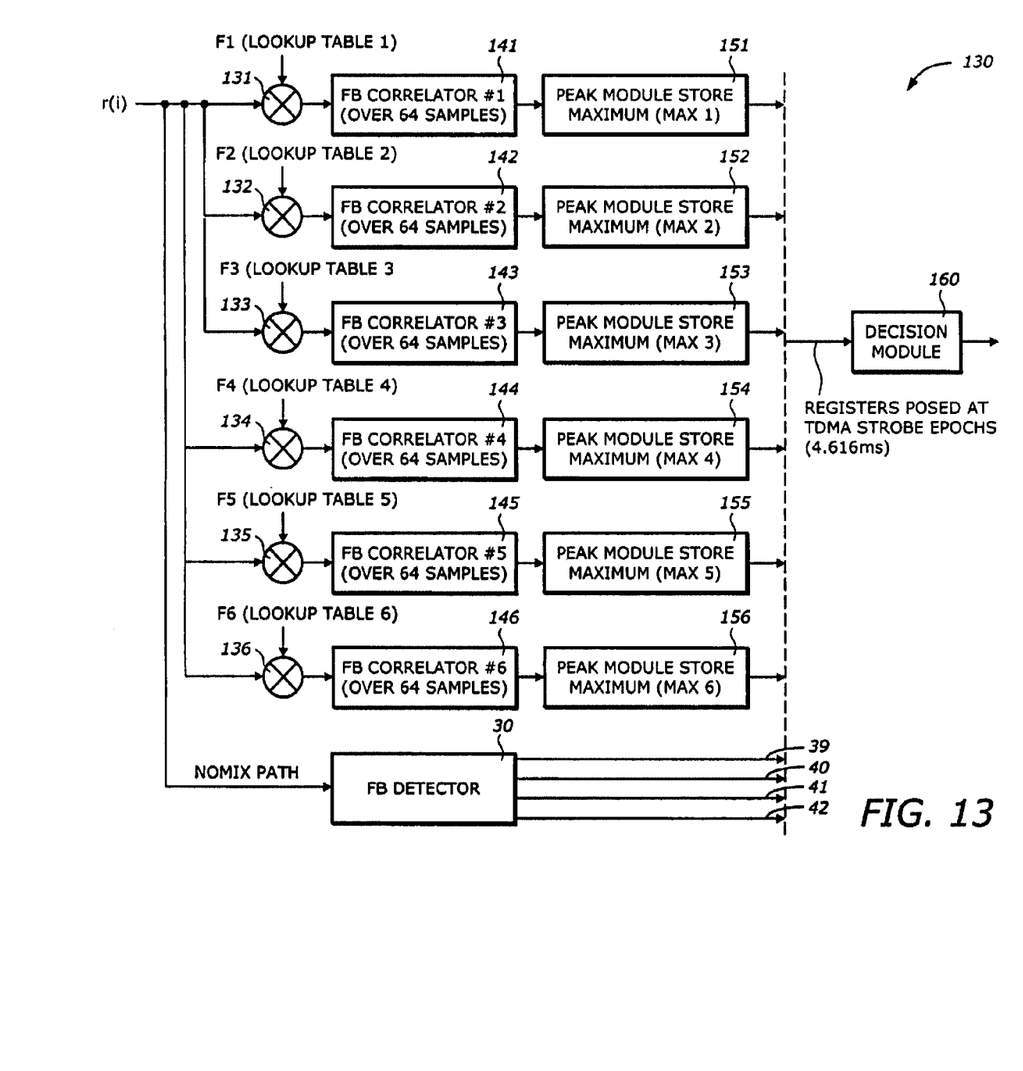
FIG. 13 is a diagram of a second system for detecting a frequency correction burst with low probability of missed detection.

One embodiment of another system which also provides a lower probability of missed detection than the system of FIG. 3 is illustrated in FIG. 13. This system 130 requires less hardware logic and cycle complexity than the system 120 of FIG. 12, but may waste one or more FB time in order to figure out whether a frequency error is very large.

Referring to FIG. 13, the system 130 includes the FB detector 30 of the present invention, six mixers 131, 132, 133, 134, 135, 136, six FB correlators 141, 142, 143, 144, 145, 146, and six peak modules 151, 152, 153, 154, 155, 156. This is only an exemplary implementation of the system 130. The system 130 can be implemented with any number of mixers, FB correlators and peak modules.

Referring to FIG. 13, the system 130 has 7 signal paths including a path marked "NOMIX path". Except for the NOMIX path, each of the remaining paths includes a mixer 131, 132, 133, 134, 135, or 136, a FB correlator 141, 142, 143, 144, 145, or 146, and a peak module. 151, 152, 153, 154, 155, or 156. Each of the mixers is used to translate the center frequency of the received signal r(i) by a predetermined frequency amount. The predetermined amounts of frequency which are used as inputs to the mixers 131, 132, 133, 134, 135, 136 are $f_1, f_2, f_3, f_4, f_5, f_6$, respectively. For ease of implementation, $f_1, f_2, f_3, f_4, f_5, f_6$ can be chosen such that $f_1=-f_4, f_2=-f_5, f_3=-f_6$. Due to their simple relationships, sampled values of these 6 frequencies can be retrieved from only three look-up tables, instead of six look-up tables. The three look-up tables are preferably stored in an on-chip random access memory (RAM).

Each of the FB correlators operates to search for a FB in a different translated signal. Thus, the FB correlators are searching for a FB over different ranges of frequencies. Appropriate choices of the frequencies $f_1, f_2, f_3, f_4, f_5, f_6$ can make these ranges of frequencies mutually exclusive. The outputs of each of the FB correlators are correlation outputs, which are complex numbers, as described above.

Each of the peak modules 151, 152, 153, 154, 155, 156 computes a maximum of the magnitudes of the correlation outputs received from a respective FB correlator. Each of the peak modules also includes a register to store a threshold, compares the respective maximum with the threshold and only outputs the maximum if it is greater than the threshold. Each of the peak modules can also include a buffer to store a set of maxima. All of the maxima produced by all the peak modules 151, 152, 153, 154, 155, 156, along with the outputs from the FB detector 30 will be examined by a decision module 160 at certain time, e.g., at a start of a TDMA frame. Either one of the maxima or the outputs of the FB detector will be chosen by the decision module 160. If one of the maxima is chosen, then the corresponding mixer input frequency is selected to bias the reference oscillator of the receiver. For example, if the output. MAX1 of the peak module 151 is chosen, then the frequency $f_1$ is selected to bias the oscillator. If the outputs of the FB detector is selected, then the selected frequency error 43 is used to biased the reference oscillator.

Each of the six FB correlators is the FB correlator of the present invention. In the embodiment of the system 130 as shown in FIG. 13, each of the FB correlators 141, 142, 143, 144, 145, 146 uses 64 samples of input signal to produce one correlation output, while the FB correlator 32 inside the FB detector 30 uses only 16 samples. The choice of 64 samples for the six FB correlators 141, 142, 143, 144, 145, 146 is to provide better performance in signal selectivity. By signal selectivity, it is meant that each of the six FB correlators operates within a very narrow frequency range and at least one of the six FB correlators will produce a high magnitude output.

Figure 14:
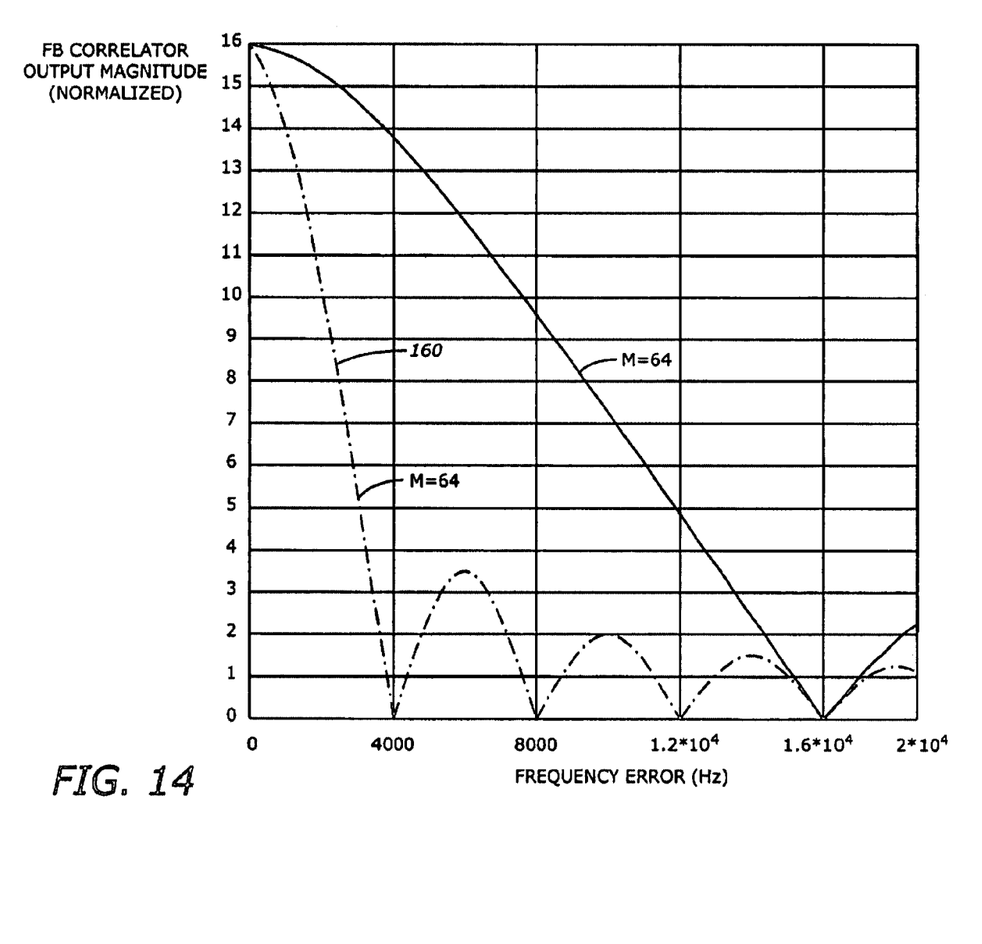
FIG. 14 is a graph of the magnitude of a FB correlator output as a function of the frequency error for the two cases M=16 and M=64, M being the number of signal samples used by the FB correlator to produce one correlation output.

FIG. 14 illustrates the magnitude of a FB correlator output as a function of frequency error for the two cases M=16 samples and M=64 samples. Referring to FIG. 14, the main lobe of the output magnitude for the case M=64 rolls off a lot faster the one for the case M=16. Since the main lobe 160 is narrow, the distance between the frequencies of the sidelobes and the frequency of the received signal is larger than the one for the case where M=16. Thus, each of the six FB correlators 141, 142, 143, 144, 145, 146 operates in a very small range of frequency. This requires that the paths of the six FB correlators be separated from each other in frequency by small amounts, in order to cover a full interval of search. This separation can be done by selecting suitable mixer frequency values $f_1, f_2, f_3, f_4, f_5, f_6$.

The frequency error due to an inexpensive crystal oscillator typically has a Gaussian probability distribution function with low variance. Thus, with high probability, the initial frequency error (for example, at start-up, when the cellular phone is turned on) is within±5 kHz, and can be detected with the FB detector 30 of the path marked "NOMIX path" in FIG. 13. For the few times when the initial frequency error is greater than±5 kHz, one of the other paths in FIG. 13 will detect this error. This error estimate will then be used to bias the crystal oscillator of the receiver appropriately to reduce the error to within the operating range (±5 kHz) of the NOMIX path. The main purpose of the paths containing the FB correlators 141, 142, 143, 144, 145, 146 is to detect when the initial error is out of operating range of the FB detector 30. For example, if the frequency error is near. $-f_1$ kHz, the output of the FB correlator 141 which succeeds the $+f_1$ kHz mixer 131 will have the highest magnitude output among all the FB correlator magnitude outputs. Thus, the output of the peak module 151 will be selected. The corresponding frequency $f_1$ will then be used to bias the oscillator. Subsequently, future FBs will arrive at the FB detector 30 with almost no frequency error.

The systems 120 of FIG. 12 and 130 of FIG. 13 find particular applications in the systems DCS 1800 and PCS 1900, where the initial frequency errors can be as large as twice the one in the GSM system when the same LO is used to generate the reference carrier frequency.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising the operations of:
   (a) correlating K sequences of ordered samples in a first signal with a predetermined waveform to produce K correlation outputs, each of the K correlation outputs corresponding to one of the K sequences and having a magnitude and being associated with an order index, K being an integer, the predetermined waveform corresponding to a frequency correction burst included in the first signal;
   (b) storing the K correlation outputs in a buffer according to the order indices; and
   (c) estimating a parameter based on the K correlation outputs, the parameter indicating detection of the frequency correction burst;
   wherein operation (c) comprises the operations of:
      (1) combining each N of the K correlation outputs to produce a first value associated with one of the order indices, N being an integer smaller than K;
      (2) determining a maximum first value of the first values; and
      (3) determining a peak index as the parameter, the peak index being an order index associated with the maximum first value, the peak index indicating timing of the frequency correction burst.

2. The method of claim 1 wherein operation (c) further comprises the operations of:
   (4) combining each N2 of the K correlation outputs to produce a second value associated with one of the order indices, N2 being an integer smaller than K; and
   (5) computing a set of frequency errors based on the second values, each of the frequency errors corresponding to one of the order indices, one of the frequency errors corresponding to the peak index.

3. The method of claim 2 wherein each of the frequency errors corresponds to a phase difference between two of the K correlation outputs.

4. The method of claim 2 wherein each of the frequency errors corresponds to an average phase difference between two of the K correlation outputs.

5. The method of claim 2 further comprising an operation of computing a quality metric for each of the frequency errors.

6. The method of claim 5 wherein the operation of computing the quality metric includes an operation of computing a squared magnitude of one of the K correlation outputs.

7. The method of claim 1 wherein operation (2) further comprises the operations of:
   comparing each of the correlation output magnitudes with a threshold;
   counting consecutive correlation output magnitudes that are greater than the threshold; and
   determining the maximum first value when the count of consecutive correlation output magnitudes that are greater than the threshold is equal to L, L being related to a duration of the frequency correction burst.

8. The method of claim 7 wherein the threshold is proportional to a running sum of squared magnitudes of a number of ordered samples.

9. The method of claim 2 wherein N is equal to 2 in operation (1).

10. The method of claim 2 wherein operation (c) comprises the operations of:
    (1) combining each N2 of the K correlation outputs to produce a second value associated with one of the order indices, N2 being an integer smaller than K; and
    (2) computing a set of frequency errors based on the second values, each of the frequency errors corresponding to one of the order indices, one of the frequency errors being the parameter.

11. The method of claim 10 wherein each of the frequency errors corresponds to a phase difference between two of the K correlation outputs.

12. The method of claim 10 wherein each of the frequency errors corresponds to an average phase difference between two of the K correlation outputs.

13. The method of claim 10 wherein N2 is equal to 2 in operation (1).

14. The method of claim 10 further comprising the operation of computing a quality metric for each of the frequency errors.

15. The method of claim 14 wherein the operation of computing the quality metric includes an operation of computing a squared magnitude of one of the K correlation outputs.

16. The method of claim 2 wherein K is greater than or equal to 132.

17. The method of claim 2 wherein each of the ordered samples is a complex number corresponding to a symbol.

18. The method of claim 2 wherein, in operation (a), each of the K sequences has $2^L$ ordered samples, where L is an integer greater than 1.

19. The method of claim 2 wherein the K sequences of ordered samples are overlapping.

20. The method of claim 2 wherein the predetermined waveform is a sine wave.

21. The method of claim 2 wherein operation (a) includes no scalar multiplication.

22. The method of claim 2 wherein operation (a) is performed recursively.

23. The method of claim 2 wherein the first signal is generated by mixing a received complex signal with a complex sinusoidal signal centered at a predetermined frequency.

24. A detector comprising:
    (a) a correlator to correlate K sequences of ordered samples in a signal with a predetermined waveform to produce K correlation outputs, each of the K correlation outputs corresponding to one of the K sequences and having a magnitude and being associated with an order index, K being an integer, the predetermined waveform corresponding to a frequency correction burst included in the signal;
    (b) a buffer coupled to the correlator to receive the K correlation outputs, the buffer storing the K correlation outputs according to the order indices; and
    (c) an estimator coupled to the buffer, the estimator estimating a parameter based on the K correlation outputs, the parameter indicating detection of the frequency correction burst;
    wherein the estimator comprises:
       a combining module combining each N of the K correlation outputs to produce a first value associated with one of the order indices, N being an integer smaller than K; and
       a peak detector coupled to the combining module to receive the first values, the peak detector determining a maximum first value of the first values and a peak index as the parameter, the peak index being an order index associated with the maximum first value, the peak index indicating timing of the frequency correction burst.

25. The detector of claim 24 wherein the estimator further comprises:
a second combining module combining each N2 of the K correlation outputs to produce a second value associated with one of the order indices, N2 being an integer smaller than K; and
a frequency module coupled to the second combining module to receive the second values, the frequency module computing a set of frequency errors based on the second values, each of the frequency
errors corresponding to one of the order indices, one of the frequency
errors corresponding to the peak index.

26. The detector of claim 25 wherein the estimator computes the frequency errors such that each of the frequency errors corresponds to a phase difference between two of the K correlation outputs.

27. The detector of claim 25 wherein the frequency module includes a running sum module, the running sum module computing the frequency errors such that each of the frequency errors corresponds to an average phase difference between two of the K correlation outputs.

28. The detector of claim 25 wherein the frequency module computes and produces a quality metric for each of the frequency errors.

29. The detector of claim 24 wherein the estimator further comprises:
a threshold module producing a threshold; and
a counter module coupled to the threshold module, the counter module counting consecutive correlation output magnitudes that are greater than the threshold and outputting a control signal when the count of said consecutive output magnitudes is equal to L, L being related to a duration of the frequency correction burst; and wherein the peak detector is coupled to the counter module, the peak detector determining the maximum first value of the first values and the peak index in response to reception of the control signal.

30. The detector of claim 29, wherein the threshold module comprises:
a squared magnitude module computing squared magnitudes of a number of ordered samples;
a running sum module coupled to the squared magnitude module to receive the squared magnitudes, the running sum module including a delay element and two adders, computing recursively a running sum of the squared magnitudes; and
a scaling module coupled to the running sum module, the scaling module scaling the running sum of the squared magnitudes by a scale factor.

31. The detector of claim 24 wherein the estimator further comprises:
a second combining module combining each N of the K correlation outputs to produce a second value associated with one of the order indices, N being an integer smaller than K; and
a frequency module coupled to the second combining module to receive the second values, the frequency module computing a set of frequency errors based on the second values, each of the frequency errors corresponding to one of the order indices, one of the frequency errors being the parameter.

32. The detector of claim 31 wherein the estimator computes the frequency errors such that each of the frequency errors corresponds to a phase difference between two of the K correlation outputs.

33. The detector of claim 31 wherein the frequency module includes a running sum module, the running sum module computing the frequency errors such that each of the frequency errors corresponds to an average phase difference between two of the K correlation outputs.

34. The detector of claim 31 wherein the frequency module computes and produces a quality metric for each of the frequency errors.

35. The detector of claims 24 wherein the correlator includes a delay element, two adders and no scalar multiplier.

36. The detector of claim 24 wherein the correlator computes the K correlation outputs recursively.

37. The detector of claim 24 wherein the buffer is circular.

38. A method for detecting a frequency correction burst included in a first signal, the first signal comprising ordered first samples, the method comprising the operations of:
(a) correlating K sequences of the ordered first samples with a predetermined waveform to produce K correlation outputs, each of the K correlation outputs corresponding to one of the K sequences and having a magnitude and being associated with an order index, K being an integer, the predetermined waveform corresponding to the frequency correction burst;
(b) storing the K correlation outputs in a buffer according to the order indices;
(c) combining each N of the K correlation outputs to produce a first value associated with one of the order indices, N being an integer smaller than K;
(d) determining a maximum first value of the first values;
(e) determining a first peak index, the first peak index being an order index associated with the maximum first value, the first peak index indicating timing of the frequency correction burst;
(f) computing a set of frequency errors based on the K correlation outputs, each of the frequency errors corresponding to one of the order indices, a first frequency error of the frequency errors corresponding to the first peak index; and
(g) computing a quality metric associated with each of the frequency errors.

39. The method of claim 38 further comprising the operations of:
(h) converting the first signal to a second signal by translating a center frequency of the first signal by a first predetermined amount of frequency, the second signal comprising ordered4 second samples; and
(i) performing operations (a) through (g) for the second signal, substituting the ordered second samples for the ordered first samples in operation (a), resulting in a second peak index in operation (e) and a second frequency error corresponding to the second peak index in operation (f).

40. The method of claim 39 further comprising the operations of:
(j) converting the first signal to a third signal by translating the center frequency of the first signal by a second predetermined amount of frequency, the third signal comprising ordered third samples;
(k) performing operations (a) through (g) for the third signal, substituting the ordered third samples for the ordered first samples in operation (a), resulting in a third peak index in operation (e) and a third frequency error corresponding to the third peak index in operation (f); and (l) selecting one of the first, second and third frequency errors based on associated quality metrics.

41. The method of claim 40 wherein the first signal is obtained by changing a phase of a received signal by 180 degrees.

42. A system for detecting a frequency correction burst included in a first signal with low probability of missed detection, the first signal comprising ordered first samples, the system comprising:
  (a) a first detector receiving the first signal, the first detector comprising:
    (1) a correlator correlating K sequences of the ordered first samples with a predetermined waveform to produce K correlation outputs, each of the K correlation outputs corresponding to one of the K sequences and having a magnitude and being associated with an order index, K being an integer, the predetermined waveform corresponding to the frequency correction burst;
    (2) a buffer coupled to the correlator to receive the K correlation outputs, the buffer storing the K correlation outputs according to the order indices;
    (3) a timing estimator coupled to the buffer, the timing estimator comprising:
      a combining module combining each N of the K correlation outputs to produce a first value associated with one of the order indices, N being an integer smaller than K; and
      a peak detector coupled to the combining module to receive the first values, the peak detector determining a maximum first value of the first values and a peak index, the peak index being an order index associated with the maximum first value, the peak index indicating timing of the frequency correction burst; and
    (4) a frequency error estimator coupled to the buffer and to the timing estimator, the frequency error estimator comprising:
      a second combining module combining each N2 of the K correlation outputs to produce a second value associated with one of the order indices, N2 being an integer smaller than K; and
      a frequency module coupled to the second combining module to receive the second values, the frequency module computing a set of frequency errors based on the second values and computing a quality metric associated with each of the frequency errors, each of the frequency errors corresponding to one of the order indices, one of the frequency errors corresponding to the peak index.

43. The system of claim 42 further comprising:
  (b) a first mixer for translating a center frequency of the first signal by a first predetermined amount of frequency and outputting a second signal; and
  (c) a second detector coupled to the first mixer to receive the second signal, the second detector being identical to the first detector, operating identically as the first detector on the second signal and outputting a second peak index, a second frequency error corresponding to the second peak index and a second quality metric associated with the second frequency error.

44. The system of claim 43 further comprising:
  (d) a second mixer for translating the center frequency of the first signal by a second predetermined amount of frequency and outputting a third signal; and
  (e) a third detector coupled to the second mixer to receive the third signal, the third detector being identical to the first detector, operating identically as the first detector on the third signal and outputting a third peak index, a third frequency error corresponding to the third peak index and a third quality metric associated with the third frequency error.

45. The system of claim 44 wherein the second predetermined amount of frequency is equal to a negative of the first predetermined amount of frequency.

46. The system of claim 42 further comprising:
  (b) a first mixer translating a c enter frequency of the first signal by a first predetermined amount of frequency and outputting a second signal, the second signal comprising ordered second samples; and
  (c) a second detector: coupled to the first mixer to receive the second signal, the second detector comprising:
    (1) a second correlator correlating K sequences of the ordered second samples with the predetermined waveform to produce K second correlation outputs, each of the K second correlation outputs corresponding to one of the K sequences of the ordered second samples and having a magnitude and being associated with an order index; and
    (2) a first peak module coupled to the second correlator to receive the K second -correlation outputs, the first peak module determining and producing a first maximum of the K second correlation outputs.

47. The system of claim 46 further comprising:
  (d) a second mixer translating the center frequency of the first signal by a second predetermined amount of frequency and outputting a third signal, the third signal comprising ordered third samples; and
  (e) a third detector coupled to the second mixer to receive the third signal, the third detector comprising:
    (1) a third correlator correlating K sequences of the ordered third samples with the predetermined waveform to produce K third correlation outputs, each of the K third correlation outputs corresponding to one of the K sequences of the ordered third samples and having a magnitude and being associated with an order index; and
    (2) a second peak module coupled to the third correlator to receive the K third correlation outputs, the second peak module determining and producing a second: maximum of the K third correlation outputs.

48. The system of claim 47 wherein the second predetermined amount of frequency is equal to a negative of the first predetermined amount of frequency.

49. The system of claim 47 wherein the first and second peak modules compare the first and second maxima to first and second thresholds, respectively.

* * * * *